(12) United States Patent
Thomas

(10) Patent No.: US 7,836,205 B2
(45) Date of Patent: *Nov. 16, 2010

(54) METHOD AND DEVICE FOR USE WITH A VIRTUAL NETWORK

(75) Inventor: David Andrew Thomas, Atherton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2129 days.

This patent is subject to a terminal disclaimer.

(21) Appl. No.: 10/192,609

(22) Filed: Jul. 11, 2002

(65) Prior Publication Data

US 2004/0010618 A1   Jan. 15, 2004

(51) Int. Cl.
*G06F 15/16* (2006.01)

(52) U.S. Cl. ........................... 709/245; 709/246

(58) Field of Classification Search ................. 709/245, 709/238, 246; 713/154
See application file for complete search history.

(56) References Cited

U.S. PATENT DOCUMENTS

| | | | | |
|---|---|---|---|---|
| 5,367,636 | A  * | 11/1994 | Colley et al. | 709/245 |
| 6,154,839 | A  * | 11/2000 | Arrow et al. | 713/154 |
| 6,434,627 | B1 * | 8/2002  | Millet et al. | 709/245 |
| 6,603,763 | B1 * | 8/2003  | Koshino | 370/389 |
| 6,661,799 | B1 * | 12/2003 | Molitor | 370/401 |
| 6,701,437 | B1 * | 3/2004  | Hoke et al. | 713/201 |
| 6,751,728 | B1 * | 6/2004  | Gunter et al. | 713/153 |
| 2001/0018714 | A1 * | 8/2001  | Yagyu et al. | 709/245 |
| 2002/0129095 | A1 * | 9/2002  | Hatalkar | 709/203 |
| 2002/0138628 | A1 * | 9/2002  | Tingley et al. | 709/227 |

OTHER PUBLICATIONS

Cisco, "VLAN Interoperability", Jul. 14, 1995, Cisco Systems, pp. 1-3.*
DARPA, "Internet Protocol", Sep. 1981, Defense Advaces Research Projects Agency, RFC 791.*

* cited by examiner

*Primary Examiner*—Larry Donaghue
*Assistant Examiner*—Brian J Gillis

(57) ABSTRACT

A computer system for interconnecting nodes in a virtual network includes a first network device configured to receive an information packet including a destination address and a virtual network identifier from a source node. The first network device includes a first translation table for use in translating the destination address and the virtual network identifier into an address indicator which is used in the computer network system to replace the destination address in the information packet and to denote a destination node specified by the destination address. The computer network system includes a second network device configured to receive the information packet including the address indicator. The second network device includes a second translation table for use in translating the address indicator into the destination address and the virtual network identifier.

19 Claims, 3 Drawing Sheets

METHOD AND DEVICE FOR USE WITH A VIRTUAL NETWORK

BACKGROUND OF THE INVENTION

1. Field of Invention

The present invention relates generally to network devices and to computer network systems which comprise network devices.

2. Background Information

Computer network systems, such as Local Area Networks (LANs), use network devices to interconnect nodes. Many computer network systems are implemented using Ethernet to provide a relatively high bandwidth interconnection of many nodes.

The nodes of a computer network system communicate using an established communication protocol to achieve point to point communication. Often, these protocols also include a multicast mechanism to send a data packet to multiple end nodes, and include a broadcast mechanism to send a data packet to all end nodes. This broadcast mechanism can limit the scalability of a computer network system.

In addition to a broadcast mechanism, other techniques exist for directing a data packet to an end node. The virtual LAN (VLAN) standard allows for grouping nodes into Logical LAN groupings on a single fabric. In a VLAN environment, packets are assigned to a particular logical LAN and the packet is constrained to stay within that logical LAN. This ensures that unicast packets cannot be received outside of a particular grouping. Broadcast and multicast packets from a given node with a virtual LAN are similarly constrained to remain within the virtual LAN. The traffic containment that VLAN's provide, along with the controlled distribution of multicast packets, can permit a greater number of end nodes to be supported on a fabric. The IEEE VLAN standard has limited the length of a VLAN tag used to define the number of possible VLAN's within a computer network system to 12 bits.

SUMMARY OF THE INVENTION

Exemplary embodiments of the present invention are directed to providing a computer system for interconnecting nodes in virtual networks. The computer network system comprises a first network device configured to receive an information packet including a destination address and a virtual network identifier from a source node. The first network device includes a first translation table for use in translating the destination address and the virtual network identifier into an address indicator which is used in the computer network system to replace the destination address in the information packet and to denote a destination node specified by the destination address. The computer network system comprises a second network device configured to receive the information packet including the address indicator. The second network device includes a second translation table for use translating the address indicator into the destination address and the virtual network identifier. The second network device is configured to send the information packet including the destination address and the virtual network identifier to the destination node denoted by the address indicator.

Exemplary embodiments of the present invention are also directed to a network device for use with a virtual network. The network device includes first and second ports, and is configured to receive an information packet including a destination address in a virtual network identifier across the first port. The network device includes a translation unit including a translation table for use in translating the destination address and the virtual network identifier into an address indicator which is used to replace the destination address in the information packet and to denote a destination node specified by the destination address. The network device is configured to transfer the information packet including the address indicator across the second port.

The present invention is also directed to a method for controlling communications in a virtual network. An exemplary method comprises receiving an information packet with the destination address and a virtual network identifier at a network device of a computer network system. The method comprises, at the network device, translating the destination address and virtual network identifier into an address indicator which is used to replace a destination address in the information packet and to denote a destination node specified by the destination address. The method includes sending the information packet with the address indicator from the network device.

DETAILED DESCRIPTION OF THE PREFERRED EMBODIMENTS

Figure 1:
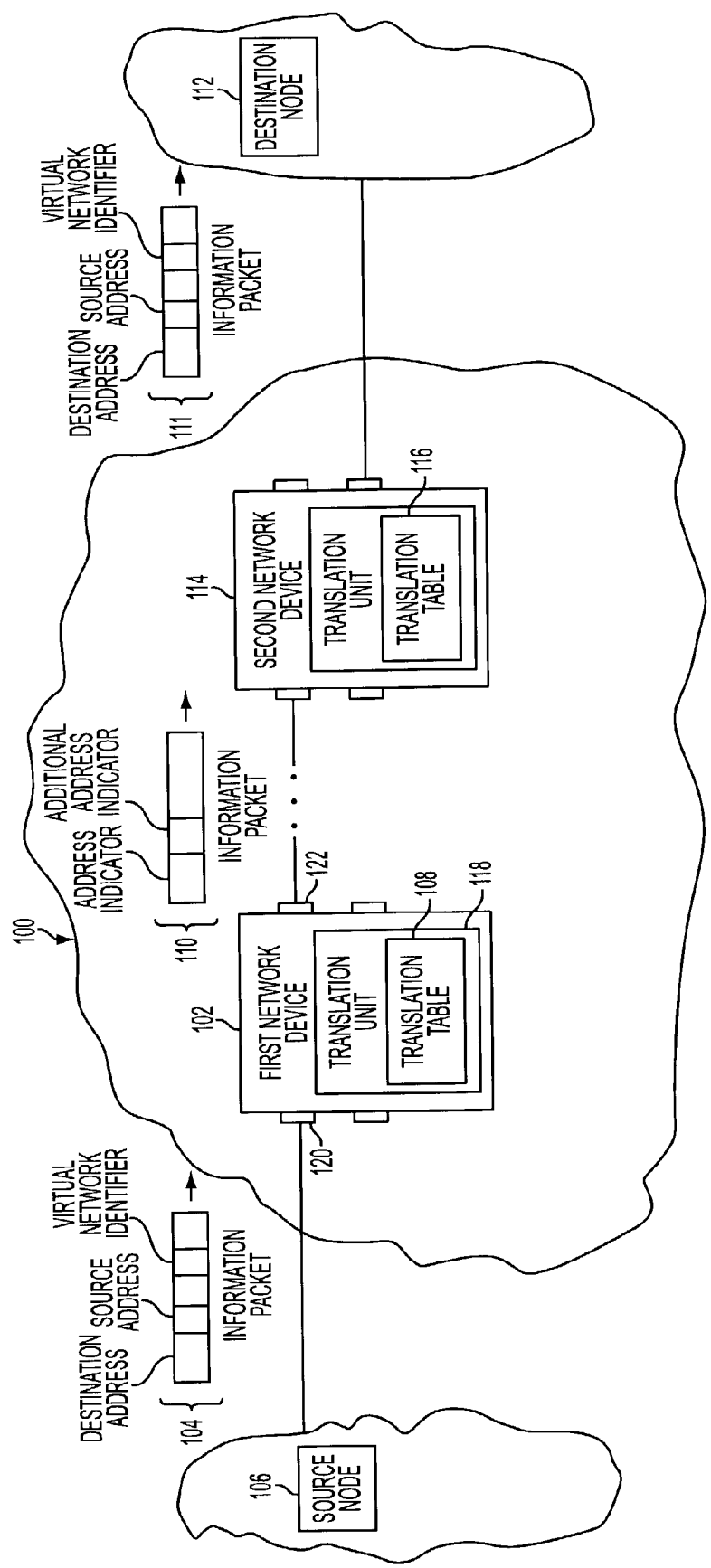
FIG. 1 is a diagram of an exemplary embodiment of the present invention illustrating a computer network system and a network device.

In an exemplary embodiment of the present invention, a computer system for interconnecting nodes, such as the computer network system 100 of FIG. 1, includes a first network device configured to receive an information packet including a destination address and a virtual network identifier from a source node. In the FIG. 1 example, the computer network system 100 includes a first network device 102 configured to receive an information packet 104 from a source node 106. The first network device 102 can be implemented using a modified switch, a modified bridge, or the like.

In an exemplary embodiment, the information packet is a packet arranged according to any suitable protocol. For example, the information packet can be arranged using the Ethernet protocol, such as any of the IEEE-802-based standards. In an exemplary embodiment, the information packet can be an Ethernet packet which supports a VLAN standard.

The words "destination" and "source" in the terms "destination node" and "source node" refer to the nodes without limiting the function of the nodes. For example, the source node can be a node which also receives information packets, and the destination node can be a node which also sends information packets. The destination address is an address associated with the destination node, and the source address is an address associated with the source node. In an exemplary embodiment, an information packet can enter the computer network from a source node and can be directed to the destination node. In this case, the "destination address" can be stored in a destination address field and the "source address" can be stored in a source address field. For an information packet entering the computer network from the destination node to be directed to the source node, the "source address" can be stored in a destination address field and the "destination address" can be stored in a source address field.

The first network device 102 includes a translation table 108 for use in translating the destination address and the virtual network identifier into an address indicator which can be used in the computer network system to replace the destination address in the information packet 110 and to denote a destination node 112 specified by the destination address. In an exemplary embodiment, the translation table stores a correspondence of an address and virtual network identifier with an address identifier that includes a ticket and group identifier.

In the FIG. 1 example, the translation table 110 is a part of a translation unit 108. The translation unit 108 can be implemented in hardware which is able to access the translation table 110 stored in memory, can be implemented in software, or can be implemented using any combination of hardware and software.

The translation table can, for example, be implemented using an associative array. The translation table can also be implemented using a hash table, such as a perfect hash table, or can be implemented in any suitable manner for achieving the desired correspondence of an address and virtual network identifier with a ticket and group identifier.

In the FIG. 1 example, a second network device 114 is configured to receive the information packet 110 including the address indicator. The second network device 114 includes a second translation table 116 for use in translating the address indicator into the destination address and the virtual network identifier. The second network device 114 is configured to send the information packet including the destination address and the virtual network identifier to the destination node denoted by the address indicator, such as destination node 112.

Those skilled in the art will appreciate that any number of additional network devices can be used to forward information packets using the address indicator. The address indicator can be used to forward the information packet within the computer network system while the destination address and virtual network identifier can be used external to the computer network system. By translating the destination address and virtual network identifier into an address indicator, the forwarding of information packets within the computer network system can be simplified.

In the FIG. 1 example, the translation tables 108 and 116 are implemented statically with the association between a destination address, virtual network identifier, address indicator and group identifier set by an administrator for the computer network system. In an alternate embodiment, the translation tables can also be updated dynamically.

In an exemplary embodiment, the first network device can check to ensure that the source node and destination node belong to the same group before forwarding the information packet.

In the FIG. 1 example, the first network device 102 checks to ensure that the source node 106 and destination node 112 belong to the same group before forwarding the information packet. The translation table 108 for a given address and virtual network identifier can store a corresponding address indicator and group identifier. If the group identifiers for the source address and destination address do not match, the network device can be configured such that it does not forward the information packet.

In an exemplary embodiment, the first network device, such as the first network device 102 of FIG. 1, can be configured to receive an additional information packet with a second destination address but without a virtual network identifier from the source node, the first network device translating the second destination address into a second address indicator.

In the FIG. 1 example, where information packets without virtual network identifiers are received by the first network device 102, destination addresses are translated by the first network device 102. In this case, the first network device can be configured to generate a virtual network identifier. For example, the translation table can use a null identifier to indicate the virtual network identifier for information packets that do not have a virtual network identifier. When the second destination address is identical to a previous destination address, the second address identifier can be set different from the previous address identifier associated with the previous destination address, since the first received information packet has a virtual network identifier and the second received information packet does not.

In exemplary embodiments, the first network device, such as first network device 102, can translate a source address into an additional address indicator that replaces the source address in the information packet, such as information packet 110. The virtual network identifier, if any, can be used in the translation process. In an exemplary embodiment, the additional address indicator can be used by another network device that forwards the information packet. The additional address indicator can be a ticket, and a prefix of the ticket can be used to update the forwarding table of another network device. The second network device, such as second network device 114, can translate the additional address indicator into the source address that replaces the address indicator in the information packet, such as the information packet 111.

In an exemplary embodiment, the translation table can be initially configured by a system configurer. Current translation table entries or an initial state for the translation table can be mapped to any suitable storage device including, but not limited to any volatile or nonvolatile memory device, such as flash memory.

The virtual network identifier can, for example, be a VLAN identifier. In the FIG. 2 example, the information packets 202 and 204 entering the computer network system 200 include VLAN IDs as the virtual network identifier.

The address indicator can, for example, be a ticket that indicates a single destination node. In the exemplary FIG. 2 embodiment, the ticket in the information packet 206 indicates the destination node 208. The destination address and VLAN ID are translated into a ticket which uniquely identifies the destination node 208.

In an exemplary embodiment, tickets identifying nodes associated with a particular network device have a common prefix. For example, multiple tickets identifying nodes associated with a second network device have a common prefix, the multiple tickets including a ticket for the destination node.

In an exemplary embodiment, the nodes can be logically grouped using the prefixes. Each network device need only store the information concerning a prefix in its forwarding table in order to forward the information packet. This can reduce the amount of data stored in the forwarding tables of the network devices. For example, if a hundred nodes are associated with each of the network devices at the edge of the computer network system 200 and prefixes are used, the size of the forwarding tables can be reduced a hundred-fold. Thus, in an exemplary embodiment, a computer network system with any number of nodes can be supported.

In an exemplary embodiment, a network device can assign a specific prefix, and the network devices can use the prefix when the network device assigns tickets to associated nodes.

The destination address can, for example, be a broadcast address, and the address indicator can be a group identifier. In the FIG. 2 example, the information packet 204 includes a broadcast address The first network device 210 translates the broadcast address into a group identifier and forwards the information packet 218 including the group identifier.

Figure 2:
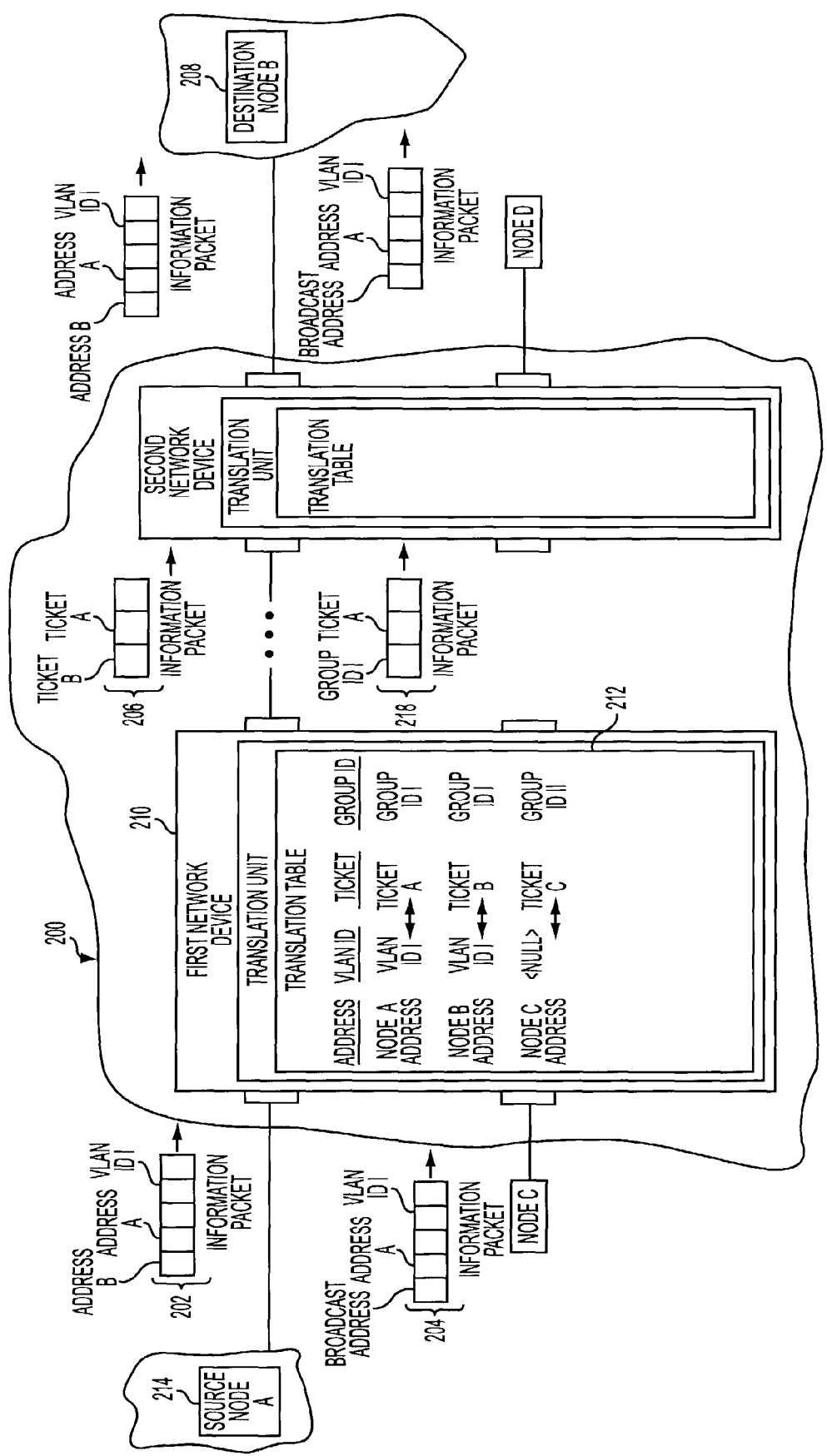
FIG. 2 is a diagram of an alternate exemplary embodiment of the present invention illustrating a computer network system an a network device.

In an exemplary embodiment, the group identifier identifies a logical LAN. For example, in the FIG. 2 embodiment, each group identifier identifies a logical LAN. In FIG. 2, the VLAN IDs (identifications) which are used external to the computer network system 200 are translated into the group identifiers. In an exemplary embodiment, the group identifier can be used to replace a destination address. The number of logical LANs that can be assigned with group identifiers can be greater than the number of assignable VLANs. Incompatible VLAN assignments are acceptable for computer networks external to the computer network system 200, and within the FIG. 2 computer network system 200, the address indicator can be used.

In the FIG. 2 example, the translation table 212 is arranged with a correspondence between addresses and virtual network identifiers with tickets and group identifiers. When the destination address is a broadcast address, the source address and virtual network identifier can be used to determine a group identifier to replace the destination address in the information packet. When the destination address is a specific node address, the destination address and virtual network identifier can be used to determine a ticket to replace the destination address in the information packet. In the FIG. 2 example, when the destination address is a specific node address, the group identifier associated with a destination address for a virtual network identifier can be checked to determine whether it matches the group identifier associated with source address for the virtual network identifier. If the group identifiers do not match, the information packet can be dropped. This feature can, for example, be used to provide security for the computer network system, and to prevent unauthorized communications outside of a group. In the FIG. 2 example, the source address and the virtual network identifier are used to determine a ticket to replace the source address in the information packet.

In an exemplary embodiment, where D=destination address, S=source address and V=virtual network identifier the translation code can be given by:

```
< D,V > ⇒Ticket(D),Group(D)
    < S,V > ⇒Ticket(S),Group(S)
        if Group(S) = = Group(D)
            insert tickets and send information packet
        else
            drop information packet
```

To control the distribution of information packets using group identifiers, a distribution tree can be associated with each group identifier. For the interconnection of network devices using forwarding tables within a computer network system, a spanning tree arrangement can be used. The spanning tree can be used to ensure that there are no loops within the topology which would cause an information packet to be forwarded endlessly. For a the multicast distribution tree, the spanning tree can be pruned so that information packets having the group identifier only go to specific nodes and network devices. Such a pruning algorithm is described for a number of multicast distribution systems, such as the Multicast Registration Protocol (GMRP) of the Generic Attribute Registration Protocol (GARP), and need not be further described herein in detail.

The use of address indicators is also described in the patent application "Method and Device For Using An Address Indicator In A Network" of David Andrew Thomas (U.S. application Ser. No. 10/192,632), filed on even date with the present application, and incorporated herein by reference. An exemplary dynamic updating of a translation table is set forth in the patent application for "Method and Device For Using Dynamic Updates In A Network" of David Andrew Thomas (U.S. application Ser. No. 10/192,631), also filed on even date with the present application and incorporated herein by reference.

In an exemplary embodiment, a network device for use with a virtual network comprises first and second ports. For example, the FIG. 1 network device 102 includes first port 120 and a second port 122. The network device 102 is configured to receive information packet 104 including a destination address and a virtual network identifier across the first port 120. The network device 102 includes a translation unit 118. The translation unit 118 includes a translation table 108 used for translating the destination address and the virtual network identifier into an address indicator. The address indicator can be used to replace the destination address in the information packet and to denote a destination node specified by the destination address. The network device 102 is configured to transfer the information packet including the address indicator across the second port 122.

In an exemplary embodiment, some ports are connected to nodes and a correspondence between ports and nodes can be used in the translation process. Other ports can be connected to additional network devices.

The network devices can be configured to associate host addresses (source addresses and destination addresses) with certain ports of the network device. This feature can be used to, for example, provide some security in the computer network system.

The network device can be configured to determine whether (for example, to ensure) that the source node and destination node belong to a common group before forwarding the information packet.

In an exemplary embodiment, the network device can be configured to receive an additional information packet with a second destination address from the source node, the network device being configured to translate the second destination address and a virtual network identifier into a second address indicator. The virtual network identifier can be a VLAN ID. The network device can also be configured to translate a source address along with the virtual network identifier into an additional address indicator that replaces the source address in the information packet.

In an exemplary embodiment, the address indicator can be a ticket that indicates a single destination node. Multiple tickets identifying nodes associated with a network device can have a common prefix, the multiple tickets including the ticket for the single destination node.

In an exemplary embodiment, the destination address can be a broadcast address, and the address indicator can be a group identifier. In an exemplary embodiment, the group identifier can identify a logical LAN.

Figure 3:
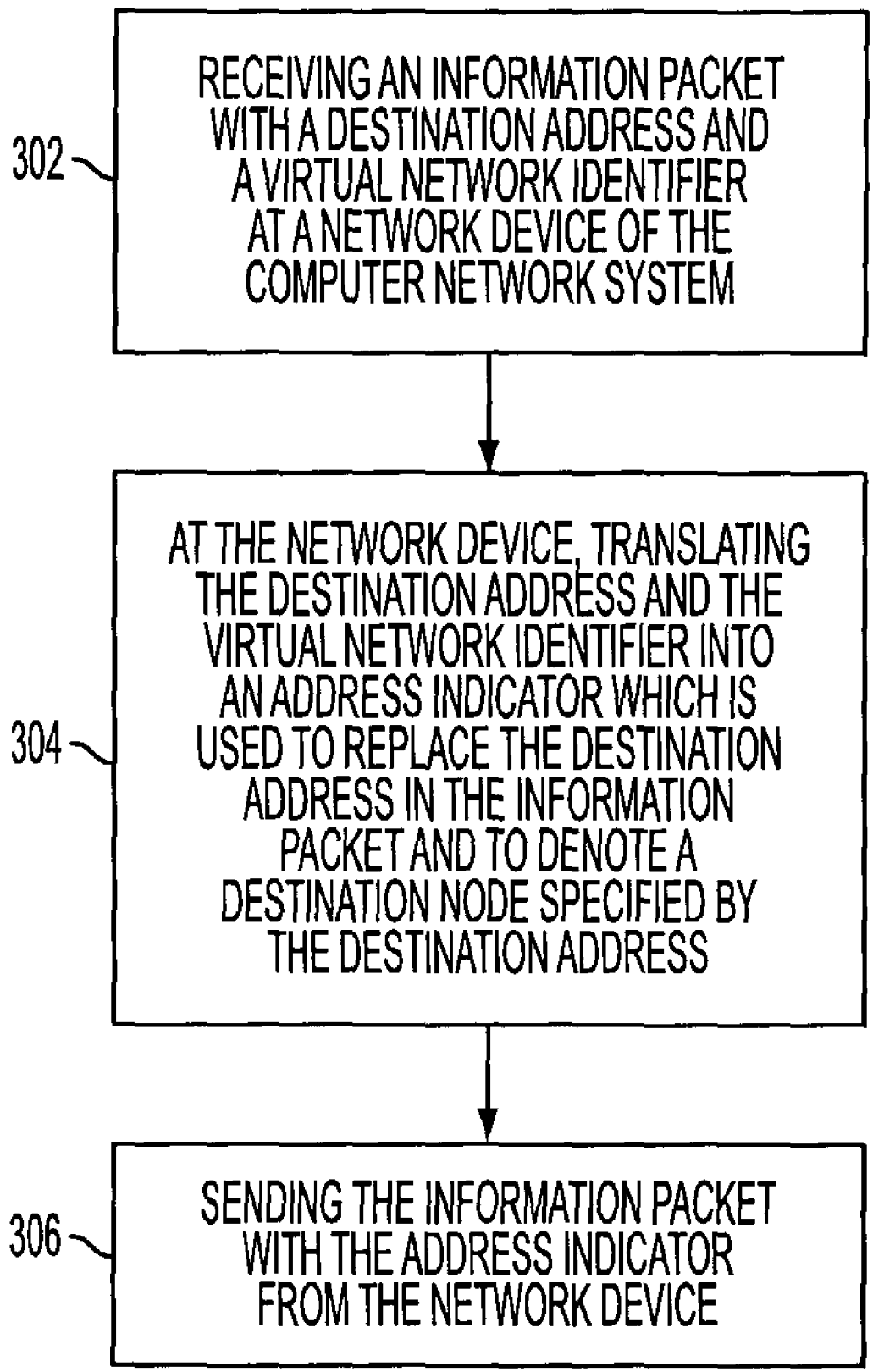
FIG. 3 is a flowchart of an exemplary embodiment of the present invention.

Exemplary embodiments also relate to a method for controlling communication in a virtual network. For example, the method can be implemented in hardware, software or any combination thereof, and can be included within one or more network devices for handling network traffic. Referring to FIG. 1, the method can be implemented as a control program stored in a computer readable medium of any one or more network devices (for example, the first and/or second network devices 102 and 104). In the FIG. 3 example, step 302 comprises receiving an information packet with a destination address and a virtual network identifier at a network device of a computer network system. Step 304 comprises, at the network device, translating the destination address and the virtual network identifier into an address indicator which is used to replace the destination address in the information packet and to denote a destination node specified by the destination address, in a manner as described herein. Step 306 comprises sending the information packet with the address indicator from the network device.

The method can include a step of determining whether the source node and destination node belong to the same group before forwarding the information packet to provide, for example, additional assurance in system operation.

The method can also include receiving an additional information packet with a second destination address from the source node, and translating the second destination address into a second address indicator.

A source address can be translated into an additional address indicator that replaces the source address in the information packet.

The address indicator can be a ticket that indicates a single destination node, and an indication of the source node can be used in the assignment of the ticket. Multiple tickets identifying nodes associated with a network device can have a common prefix, the multiple ticket, including the ticket for the single destination node.

In an exemplary embodiment, the destination address can be a broadcast address, and the address indicator can be a group identifier. In an exemplary embodiment, the group identifier can identify a logical LAN.

It will be appreciated by those of ordinary skill in the art that the invention can be implemented in other specific forms without departing from the spirit or character thereof. The presently disclosed embodiments are therefore considered in all respects to be illustrative and not restrictive. The scope of the invention is illustrated by the appended claims rather than the foregoing description, and all changes that come within the meaning and range of equivalents thereof are intended to be embraced herein.

What is claimed is:

1. A computer network system for interconnecting nodes in a virtual network, comprising:
a first network device configured to receive an information packet including a destination address and a virtual network identifier from a source node, the first network device including a first translation table for use in translating the destination address and the virtual network identifier into an address indicator which is used in a computer network system to replace the destination address in the information packet and to denote a destination node specified by the destination address; and
a second network device configured to receive the information packet including the address indicator, the second network device including a second translation table for use in translating the address indicator into the destination address and the virtual network identifier, the address indicator being replaced by the destination address and the virtual network identifier, the second network device being configured to send the information packet including the destination address and the virtual network identifier to the destination node denoted by the address indicator.

2. The computer network system of claim 1, wherein the first network device is configured to determine whether the source node and destination node belong to a common group before forwarding the information packet.

3. The computer network system of claim 1, wherein the first network device is configured to receive an additional information packet with a second destination address from the source node, the first network device being configured to translate the second destination address into a second address indicator.

4. The computer network system of claim 1, wherein the first network device translates a source address into an additional address indicator that replaces the source address in the information packet.

5. The computer network system of claim 4, wherein the second network device is configured to translate the additional address indicator into the source address, and to use the source address to replace the address indicator in the information packet.

6. The computer network system of claim 1, wherein the virtual network identifier is a VLAN ID.

7. The computer network system of claim 1, wherein the address indicator is a ticket that indicates a single destination node.

8. The computer network system of claim 7, wherein multiple tickets identifying nodes associated with the second network device have a common prefix, the multiple tickets including the ticket for the single destination node.

9. The computer network system of claim 1, wherein the destination address is a broadcast address, and wherein the address indicator is a group identifier.

10. The computer network system of claim 9, wherein the group identifier identifies a logical LAN.

11. A method for controlling communication in a virtual network, comprising:
receiving an information packet with a destination address and a virtual network identifier at a network device of a computer network system;
at the network device, translating the destination address and the virtual network identifier into an address indicator which is used to replace the destination address in the information packet and to denote a destination node specified by the destination address;
sending the information packet with the address indicator from the network device to a second network device;
at the second network device, translating the address indicator into the destination address and the virtual network identifier, the address indicator being replaced by the destination address and the virtual network identifier; and
sending the information packet including the destination address and the virtual network identifier to the destination node denoted by the address indicator.

12. The method of claim 11, comprising:
receiving an additional information packet with a second destination address from a source node; and
translating the second destination address into a second address indicator.

13. The method of claim 11, comprising:
translating a source address into an additional address indicator that replaces the source address in the information packet.

14. The method of claim 11, wherein the virtual network identifier is a VLAN ID.

15. The method of claim 11, wherein the address indicator is a ticket that indicates a single destination node.

16. The method of claim 15, wherein an indication of a source node is used in the assignment of the ticket.

17. The method of claim 15, wherein multiple tickets identify nodes associated with the single destination node have a common prefix.

18. The method of claim 11, comprising:
 determining whether a source node and destination node belong to a common group before sending the information packet, and replacing the destination address with a group identifier when the source node and the destination node belong to a common group wherein the destination address is a broadcast address, and wherein the address indicator is a group identifier.

19. The method of claim 18, wherein the group identifier identifies a logical LAN.

* * * * *